United States Patent

Olson et al.

[11] Patent Number: 5,876,054
[45] Date of Patent: *Mar. 2, 1999

[54] COMPOSITE BICYCLE FRAME AND METHOD OF MANUFACTURE

[75] Inventors: Steven H. Olson, Corona; James S. Busby, Costa Mesa; Stanley A. Needle, Irvine, all of Calif.

[73] Assignee: GT Bicycles, Inc., Santa Ana, Calif.

[ * ] Notice: The term of this patent shall not extend beyond the expiration date of Pat. No. 5,803,476.

[21] Appl. No.: 709,585

[22] Filed: Sep. 6, 1996

Related U.S. Application Data

[63] Continuation-in-part of Ser. No. 519,568, Aug. 25, 1995, Pat. No. 5,803,476.

[51] Int. Cl.[6] ................................................ B62K 19/02
[52] U.S. Cl. ................................ 280/281.1; 280/288.3; 264/258; 264/314
[58] Field of Search ............................ 280/288.3, 274, 280/281.1, 288.1, 284; 264/257, 258, 279, 314, 317, 315, 316, 319

[56] References Cited

U.S. PATENT DOCUMENTS

| | | | |
|---|---|---|---|
| 372,002 | 7/1887 | Busby et al. | D12/111 |
| 439,095 | 10/1890 | Becker. | |
| 578,615 | 3/1897 | Travis. | |
| 606,323 | 6/1898 | Wronski. | |
| 657,667 | 9/1900 | Mills. | |
| 944,795 | 12/1909 | Leet et al. | |
| 1,047,430 | 12/1912 | Michaelson. | |
| 1,257,761 | 2/1918 | Strand. | |
| 1,298,958 | 4/1919 | Johnston. | |
| 1,412,012 | 4/1922 | Bruno. | |
| 1,594,079 | 1/1926 | Tanner. | |
| 3,833,242 | 9/1974 | Thompson, Jr. | 280/281.1 |
| 3,917,313 | 11/1975 | Smith et al. | 280/284 |
| 4,259,056 | 7/1985 | Kreuz | 180/227 |

(List continued on next page.)

FOREIGN PATENT DOCUMENTS

| | | | |
|---|---|---|---|
| 3033294 | 4/1981 | Germany | 280/285 |
| 428442 | 12/1947 | Italy | 280/285 |
| 220760 | 8/1924 | United Kingdom. | |

OTHER PUBLICATIONS

1992 Cannondale Spec.—Suspension Mountain Bicycles—Article—4 pgs.
TREK 9000 Series Spec—"This Beauty Is A Beast"—Article—3 pgs.
Mountain Bike Action, Mar. '92—Fisher RS–1—4 pgs.
Mountain Bike Action, Feb. '92—Suspension Mania Strikes Cycling—3 pgs.
Mountain Bike Action, Mar. '92—Boulder Intrepid Al—2 pgs.
Mountain Bike Action, Jul. '92—Team Shockblok—6 pgs.
Mountain Bike Action, Jun. '92—Welcome To The Next Generation—9 pgs.
Mountain Bike Action, May '92—Schwinn S.A.S.S.—7 pgs.
Offroad—Offroad Pro–Flex 550—3 pgs.
Mountain Bike Action, May '92—If The Best Motorcycle . . . " Litespeed Suspension"—8 pgs.
Mountain & City Biking—Slingshot—6 pgs.

(List continued on next page.)

*Primary Examiner*—Kevin Hurley
*Attorney, Agent, or Firm*—Stetina Brunda Garred & Brucker

[57] ABSTRACT

A composite bicycle frame comprising a continuous frame tube defining cross bar, down tube, and seat tube portions. The frame tube is formed from a fiber reinforced polymer composite. Integrally connected to the frame tube are seat tube, bottom bracket, and head tube fittings. The cross bar portion of the frame tube extends between the seat tube and head tube fittings, with the down tube portion extending between the bottom bracket and head tube fittings. The seat tube portion itself extends between the seat tube and bottom bracket fittings.

26 Claims, 2 Drawing Sheets

U.S. PATENT DOCUMENTS

| | | | |
|---|---|---|---|
| 4,322,088 | 3/1982 | Miyakoshi et al. | 280/284 |
| 4,506,755 | 3/1985 | Tsuchida et al. | 180/227 |
| 4,673,053 | 6/1987 | Tanaka et al. | 180/227 |
| 4,789,174 | 12/1988 | Lawwill | 280/284 |
| 4,828,781 | 5/1989 | Duplessis et al. | 264/314 |
| 4,850,607 | 7/1989 | Trimble | 280/281.1 |
| 4,889,355 | 12/1989 | Trimble | 280/281.1 |
| 4,902,458 | 2/1990 | Trimble | 264/46.6 |
| 4,923,203 | 5/1990 | Trimble et al. | 280/288.3 |
| 4,941,674 | 7/1990 | Trimble | 280/281.1 |
| 4,951,791 | 8/1990 | Creixell | 180/219 |
| 4,982,975 | 1/1991 | Trimble | 280/281.1 |
| 4,986,949 | 1/1991 | Trimble | 264/258 |
| 4,997,197 | 3/1991 | Shultz | 280/275 |
| 5,098,114 | 3/1992 | Jones | 280/284 |
| 5,121,937 | 6/1992 | Lawwill | 280/284 |
| 5,158,733 | 10/1992 | Trimble | 264/258 |
| 5,205,572 | 4/1993 | Buell et al. | 280/284 |
| 5,215,322 | 6/1993 | Enders | 280/231 |
| 5,244,224 | 9/1993 | Busby | 280/284 |
| 5,259,637 | 11/1993 | Busby | 280/284 |

OTHER PUBLICATIONS

Guide to Suspension and High Performance, vol. 3, 1992—pp. 9, 13–15, 17, 30–31, 36–37, 42–45, 47, 53, 60, 69, 71, 76, 85–87, 92, 96, 98, 100, 108–112, 117 and 119.

Mountain Bike Action, Oct. '92—pp. 10, 25–26, 28–29, 31, 36–37, 39–41, 44, 45, 47, 58, 70, 73, 79, 123, and 130.

Bicycling, May '92—pp. 26–27, 58, 63–64, and 105.

Mountain Biking, Nov. '92, vol. 6, No. 11—pp. 6–9, 25, 48–49, 65, 71, 73, 108–109, 115, 124, 129, 140, 143, 163, and 169.

Mountain Biking, Dec. '92—pp. 1–2, 5, 18, 44–49, 77, 127, and 160.

Mountain Biking, Jan. '93, vol. 7, No. 1—pp. 32–33, 40, 45, 71, 75, 82–83, 115 and 117.

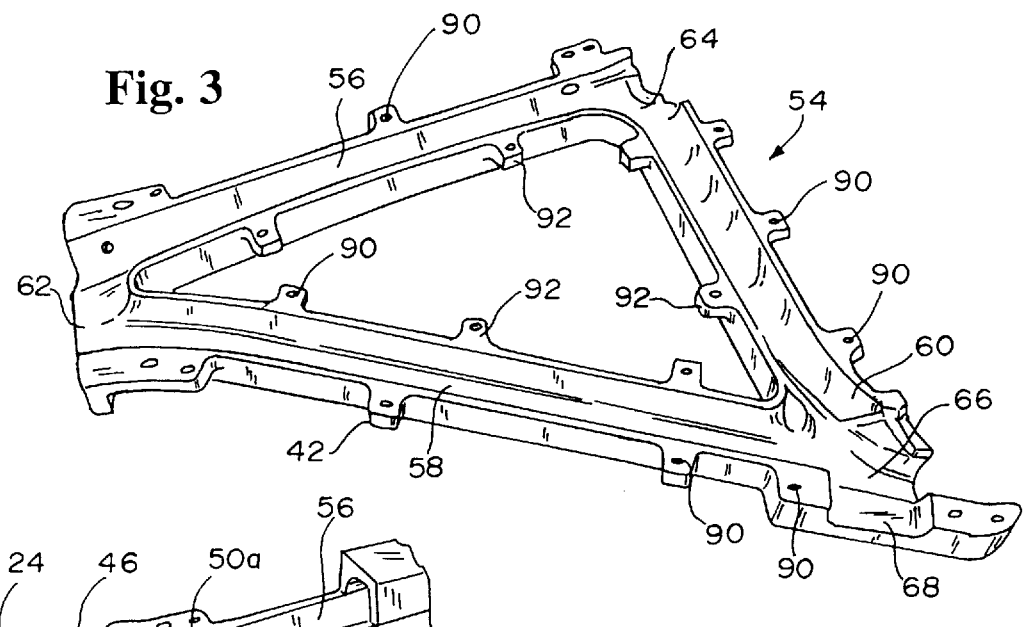
Fig. 3
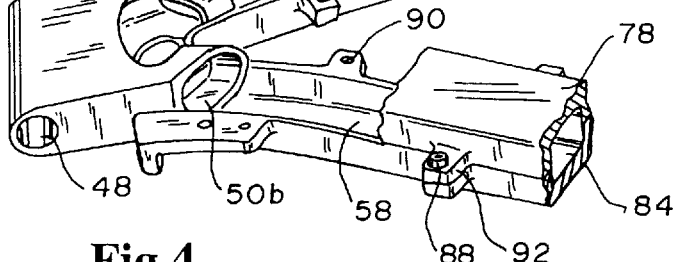
Fig. 4
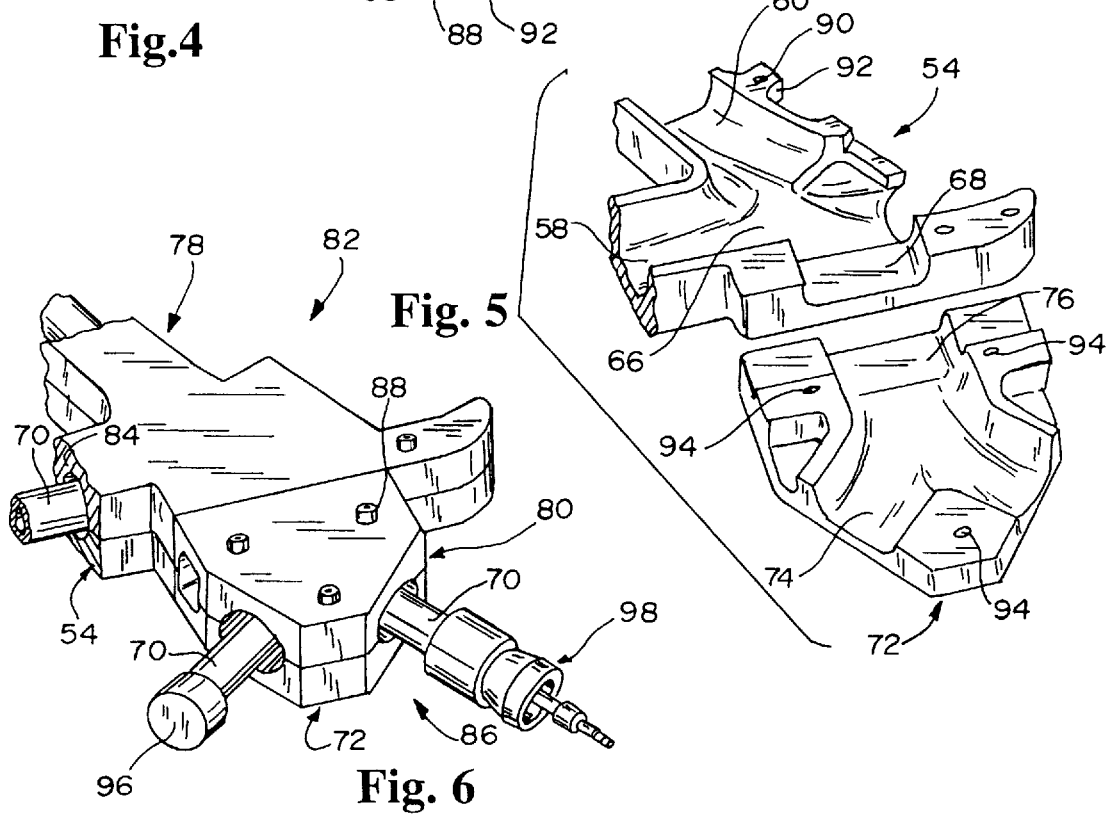
Fig. 5
Fig. 6

COMPOSITE BICYCLE FRAME AND METHOD OF MANUFACTURE

FIELD OF THE INVENTION

The present application is a continuation-in-part of U.S. application Ser. No. 08/519,568 entitled COMPOSITE BICYCLE FRAME AND METHOD OF MANUFACTURE, filed Aug. 25, 1995, U.S. Pat. No. 5,803,476 the disclosure of which is incorporated herein by reference.

The present invention relates generally to bicycles, and more particularly to a bicycle frame comprising a continuous frame tube formed from a fiber reinforced polymer composite and having metal or fiber reinforced composite or plastic (thermoset or thermoplastic polymer) seat tube, bottom bracket and head tube fittings integrally connected thereto for purposes of providing a bicycle frame which is lightweight, durable, and substantially reduces fabrication and finishing costs.

BACKGROUND OF THE INVENTION

The fabrication of bicycle frames from fiber reinforced polymer composites is well known in the prior art. For example, the use of thermoset composites to fabricate bicycle frames is disclosed in U.S. Pat. Nos. 4,850,607 and 4,889,355. In particular, these references describe the fabrication of bicycle frames through the use of resin impregnated fibrous materials such as glass, KEVLAR, or carbon fiber. According to prior art fabrication methodology, these composite bicycle frames are typically constructed by first pre-forming the elongate, composite members thereof, and then interconnecting these members with composite joints.

For example, the prior art composite bicycle frame is typically fabricated by first forming a separate cross bar, down tube, and seat tube from a fiber reinforced polymer composite, and subsequently placing these components into a common fixture. The placement of the cross bar, down tube, and seat tube into the fixture maintains their desired orientations while they are connected to each other by forming interconnecting joints therebetween with additional fiber reinforced polymer composite material.

As will be appreciated by those skilled in the art, though this prior art fabrication methodology provides a bicycle frame which is lightweight and durable, it is extremely time consuming and expensive. In this respect, each of the interconnecting joints must be individually fabricated by hand. Further, extensive hand finishing to the frame is required such that a desirable smooth outer surface is provided.

Thus, although the prior art has recognized to a limited extent the benefits of providing a lightweight and durable bicycle frame, the known fabrication methodologies for such frames have been time consuming and cost ineffective. Accordingly, there exists a need in the prior art for a method of fabricating a composite bicycle frame which is lightweight and durable, wherein the method minimizes the manual operations involved in the practice thereof, and consequently facilitates the manufacture of the bicycle frame at a substantially reduced cost. In this respect, such a method requires the minimization or elimination of the prior art steps needed to provide the interconnection of the various frame components and for providing a desirable smooth overall finish to the frame so as to substantially reduce the amount of labor involved in the fabrication process.

SUMMARY OF THE INVENTION

In accordance with the present invention, there is provided a method for forming a bicycle frame comprising the initial step of placing a seat tube fitting, a bottom bracket fitting and a head tube fitting within a first mold section. Thereafter, an elongate, flexible thermoplastic bladder covered with a nylon wrapped polymer impregnated fiber material is extended through the seat tube fitting, the bottom bracket fitting and the head tube fitting within the first mold section. A second mold section is then mated to the first mold section such that a cavity having the desired frame shape is defined therebetween. When the first and second mold sections are mated to each other, the seat tube fitting, the bottom bracket fitting and the head tube fitting may be partially or completely captured within the cavity. Additionally, the opposed first and second ends of the bladder protrude from an opening collectively defined by first and second ports disposed within the first and second mold sections, respectively, with the opening preferably (but not necessarily) being disposed adjacent the bottom bracket fitting. The nylon wrap applied to the polymer impregnated fiber material may be color dyed.

Subsequent to the mating of the first and second mold sections to each other, the polymer impregnated fiber material covering the bladder is heated by applying heat to the first and second mold sections. As the first and second mold sections are being heated, the bladder is inflated so as to cause the polymer impregnated fiber material to substantially conform to the shape of the cavity. The first and second mold sections are cooled subsequent to inflating the bladder so as to form a continuous bicycle frame tube having the seat tube fitting, the bottom bracket fitting, and the head tube fitting integrally connected thereto.

Further in accordance with the present invention, there is provided a bicycle frame which comprises a continuous frame tube defining a cross bar portion, a down tube portion, and a seat tube portion. The frame tube is formed from a carbon fiber reinforced polymer composite which includes a polymer impregnated sheet of interwoven carbon fiber material. The impregnated sheet is wrapped with an outer layer of nylon which may be color dyed.

Integrally connected to the frame tube is a seat tube fitting, a bottom bracket fitting, and a head tube fitting. The cross bar portion extends between the seat tube and head tube fittings, with the down tube portion extending between the bottom bracket and head tube fittings. Additionally, the seat tube portion extends between the seat tube and bottom bracket fittings.

BRIEF DESCRIPTION OF THE DRAWINGS

These, as well as other features of the present invention, will become more apparent upon reference to the drawings wherein:

FIG. 3 is a perspective view of the first mold section used for forming the bicycle frame shown in FIG. 1;

FIG. 4 is a partial perspective view illustrating the manner in which the head tube fitting is partially captured within the mold formed by the first and second mold sections;

FIG. 5 is a partial perspective view illustrating the manner in which a first bladder fitting section is interfaced to the first mold section; and FIG. 6 is a partial perspective view illustrating the manner in which a bladder is extended into and out of the mold formed by the first and second mold sections via a bladder fitting interfaced thereto.

DETAILED DESCRIPTION OF THE PREFERRED EMBODIMENT

Figure 1:
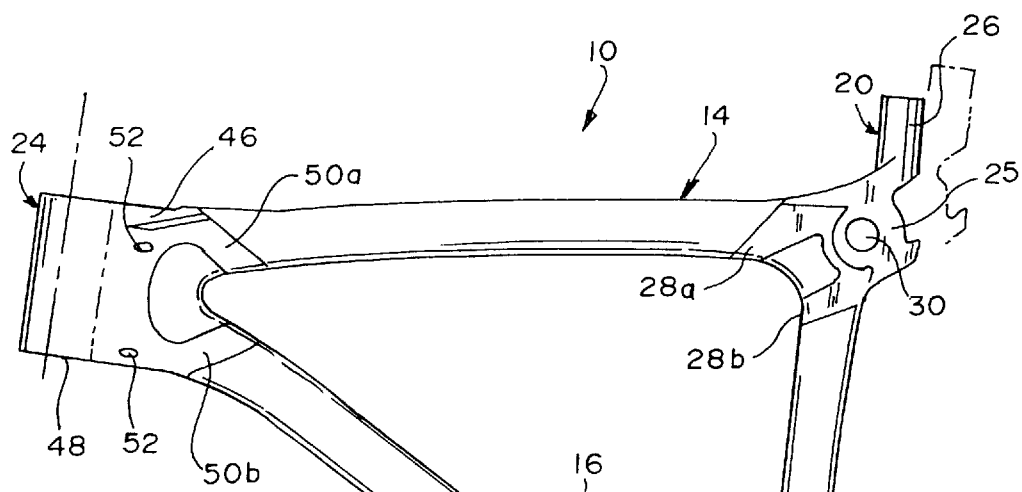
FIG. 1 is a side elevational view of the composite bicycle frame of the present invention.

Referring now to the drawings wherein the showings are for purposes of illustrating a preferred embodiment of the present invention only, and not for purposes of limiting the same, FIG. 1 illustrates a composite bicycle frame 10 constructed in accordance with the present invention. The bicycle frame 10 comprises a continuous frame tube 12 which defines a cross bar portion 14, a down tube portion 16, and a seat tube portion 18. As discussed in the parent application, the frame tube 12 is preferably fabricated from a carbon fiber reinforced polymer composite which comprises a sheet of interwoven carbon fiber material impregnated with a thermoplastic or other polymer material. The polymer impregnated sheet of carbon fiber material is preferably wrapped by an outer layer of nylon which may be color dyed to provide the resultant bicycle frame 10 with a desired color. As will be discussed in more detail below, the formation of the bicycle frame 10 from the continuous frame tube 12 formed from the polymer composite reinforced with continuous carbon fibers provides the same with enhanced structural integrity, though being lightweight.

Integrally connected to the frame tube 12 is a seat tube fitting 20, a bottom bracket fitting 22, and a head tube fitting 24. The seat tube, bottom bracket and head tube fittings 20, 22, 24 are each preferably fabricated from a metal material such as aluminum via a bending, stamping or die casting process. The fittings 20, 22, 24 may alternatively be made of fiber-reinforced thermoplastic or simply any structural polymer. Though not shown, as discussed in the parent application the seat tube fitting 20 is adapted to receive the post of the bicycle seat, with the bottom bracket fitting 22 being adapted to accommodate the crank axle, and the head tube fitting 24 being adapted to receive the handle bar stem. As seen in FIG. 1, the cross bar portion 14 of the frame tube 12 extends generally horizontally between the seat tube and head tube fittings 20, 24, with the seat tube portion 18 extending generally vertically between the seat tube and bottom bracket fittings 20, 22. Additionally, the down tube portion 16 extends at approximately a 45 degree angle between the bottom bracket and head tube fittings 22, 24. The manner in which the seat tube, bottom bracket and head tube fittings 20, 22, 24 are integrally connected to the frame tube 12 will be discussed in more detail below.

In the bicycle frame 10, the seat tube fitting 20 has a configuration which is substantially similar to the seat tube fitting described in the parent application. In this respect, the seat tube fitting 20 includes a main body portion 25 having a hollow, cylindrically configured tubular portion 26 extending upwardly therefrom. The tubular portion 26 is sized and configured to slidably receive the seat post of the bicycle seat. In addition to the tubular portion 26, formed on the main body portion 25 is a pair of loop portions 28a, 28b which define a void therebetween. The cross bar portion 14 of the frame tube 12 extends to the loop portion 28a, with the seat tube portion 18 extending to the loop portion 28b. Disposed within the main body portion 25 and extending laterally therethrough is an aperture 30 which is used to facilitate the attachment of a pair of seat stay members (not shown) to the seat tube fitting 20.

The bottom bracket fitting 22 is also substantially similar to the bottom bracket fitting described in the parent application. In this respect, the bottom bracket fitting 22 includes a main body portion 32 having first and second circularly configured apertures 34, 36 extending laterally therethrough. The first aperture 34, which has a diameter exceeding that of the second aperture 36, is sized and configured to accommodate the bicycle crank axle. The second aperture 36 is used to facilitate the attachment of a pair of chain stay members (not shown) to the bottom bracket fitting 22. The main body portion 32 of the bottom bracket fitting 22 is substantially hollow, and defines a plurality of openings which communicate with the interior thereof. In particular, the main body portion 32 defines a seat tube opening 38, a down tube opening 40, a bottom opening 42, and a pair of side openings 44, all of which communicate with the hollow interior thereof. The seat tube portion 18 of the frame tube 12 extends to the seat tube opening 38, with the down tube portion 16 extending to the down tube opening 40.

The head tube fitting 24 is also configured similarly to the head tube fitting described in the parent application. In this respect, the head tube fitting 24 includes a main body portion 46 having an elongate, circularly configured opening 48 extending vertically therethrough. The opening 48 is sized and configured to slidably receive the steer tube (not shown). Formed on the main body portion 46 is a pair of loop portions 50a, 50b which define a void therebetween. The cross bar portion 14 of the frame tube 12 extends to the loop portion 50a, with the down tube portion 16 extending to the loop portion 50b. Additionally, disposed within the main body portion 46 are apertures 52 which facilitate the extension of shift and/or brake cables into the frame tube 12.

Figure 2:
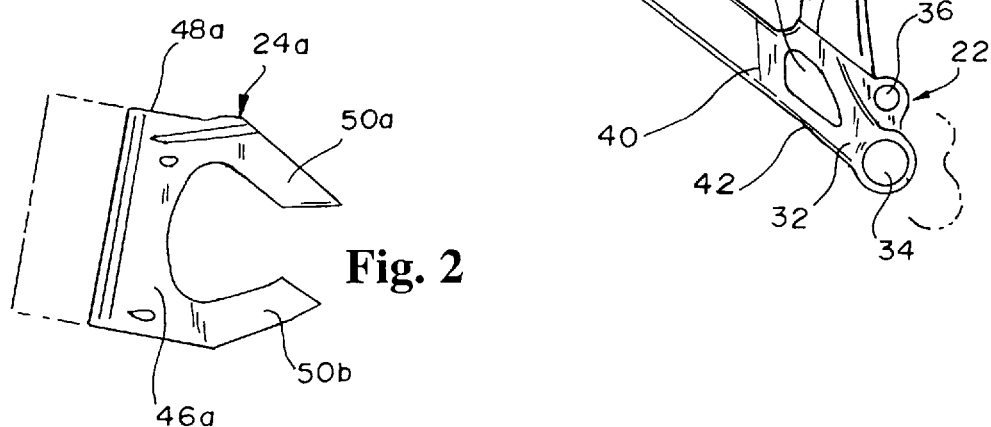
FIG. 2 is a side elevational view of a head tube fitting which may be used in the bicycle frame shown in FIG. 1.

Referring now to FIGS. 1 and 2, the bicycle frame 10 constructed in accordance with the present invention is fabricated in a manner wherein seat tube, bottom bracket and head tube fittings which have the same basic configuration but are different in size than the fittings 20, 22, 24 may be integrally connected to the frame tube 12. For example, FIG. 2 depicts a head tube fitting 24a which is substantially similar to the previously described head tube fitting 24, except that the same includes a main body portion 46a which is smaller (i.e., narrower) than the main body portion 46 of the head tube fitting 24. As such, the opening 48a of the head tube fitting 24a for receiving the handle bar stem is disposed in closer proximity to the loop portions 50a', 50b' thereof.

Similarly, as seen in FIG. 1, the seat tube fitting 20 may be formed to have a larger main body portion 25 such that the tubular portion 26 is disposed further outward relative to the frame tube 12 (as shown in phantom). The bottom bracket fitting 22 may also be formed to have a larger main body portion 32 such that the first and second apertures 34, 36 are disposed further outward relative to the frame tube 12 (as shown in phantom). Importantly, irrespective of the sizing of the main body portions 25, 32, 46 of the seat tube, bottom bracket and head tube fittings 20, 22, 24, the loop portions 28a, 28b of the seat tube fitting 20 are always maintained in the same orientation relative to the frame tube 12, as are the openings 38, 40, 42 of the bottom bracket fitting 22 and loop portions 50a, 50b, 50a', 50b' of the head tube fitting 24, 24a. The manner in which the bicycle frame 10 is fabricated so as to facilitate the integral connection of alternatively sized fittings to the frame tube 12 will also be discussed in more detail below.

Having thus described the basic structural components of the bicycle frame 12, the preferred method of manufacturing the same will now be discussed with particular reference to FIGS. 3–6. The seat tube fitting 20, bottom bracket fitting 22 and head tube fitting 24 are initially placed into a lower, first mold section 54 which has a generally triangular configuration corresponding to the basic shape of the frame tube 12. In this respect, the first mold section 54 defines a cross bar channel 56, a down tube channel 58, and a seat tube channel 60. The first mold section 54 further defines a head tube fitting recess 62 disposed between the cross bar and down tube channels 56, 58, a seat tube fitting recess 64 disposed between the cross bar and seat tube channels 56, 60, and a bottom bracket fitting recess 66 disposed between the down tube and seat tube channels 58, 60. Formed within the sidewall of the first mold section 54 and communicating with the bottom bracket recess 66 is a lower, first mold port 68, the use of which will be discussed in more detail below.

Referring now to FIGS. 3 and 4, the head tube fitting 24 is placed within the first mold section 54 such that the loop portion 50a thereof resides within the cross bar channel 56, with the loop portion 50b residing within the down tube channel 58. As best seen in FIG. 4, the head tube fitting recess 62 is sized to partially accommodate the main body portion 46 of the head tube fitting 24 when the loop portions 50a, 50b thereof are received into respective ones of the cross bar and down tube channels 56, 58. As such, a substantial section of the main body portion 46 (which includes the opening 48 disposed therein) protrudes from the first mold section 54, with only the void defined between the loop portions 50a, 50b being positioned within the head tube fitting recess 62. It will be recognized that if the head tube fitting 24a is used as an alternative to the head tube fitting 24, the loop portions 50a', 50b' would assume the same orientations within the cross bar and down tube channels 56, 58 as do the loop portions 50a, 50b.

Though not shown, as described in the parent application the seat tube and bottom bracket fittings 20, 22 are positioned within the first mold section 54 in a similar manner. In this respect, the seat tube fitting 20 is positioned within the first mold section 54 such that the loop portion 28a thereof resides within the cross bar channel 56, with the loop portion 28b residing within the seat tube channel 60. Only a small section of the main body portion 25 is positioned within the seat tube fitting recess 64. In particular, the void defined between the loop portions 28a, 28b is positioned within the seat tube fitting recess 64, with the tubular portion 26 protruding outwardly from the first mold section 54.

The bottom bracket fitting 22 is positioned within the first mold section 54 such that the seat tube opening defined thereby resides within the seat tube channel 60, with the down tube opening 40 residing within the down tube channel 58. A relatively large section of the main body portion 32 is positioned within the bottom bracket recess 66. In particular, the bottom opening 42 and side openings 44 are positioned within the bottom bracket fitting recess 66, with the bottom opening 42 being aligned with the first mold port 68. The first and second apertures 34, 36 of the bottom bracket fitting 22 are not positioned within the bottom bracket fitting recess 66, but rather are disposed in the section of the main body portion 32 which protrudes outwardly from the first mold section 54.

Since only portions of the seat tube, bottom bracket and head tube fittings 20, 22, 24 are positioned within the first mold section 54, it will be recognized that these fittings may be provided in the previously described alternative sizes without making any modifications to the first mold section 54. In this respect, since the main body portions 25, 32, 46 of the seat tube, bottom bracket and head tube fittings 20, 22, 24 protrude from the first mold section 54, they may be enlarged or expanded without affecting the positioning of the loop portions 28a, 28b, 50a, 50b or openings 38, 40, 42, 44 within the first mold section 54.

Subsequent to the placement of the seat tube, bottom bracket and head tube fittings 20, 22, 24 into the first mold section 54 in the aforementioned manner, an elongate, expandable bladder 70 is extended through the fittings and the cross bar, down tube and seat tube channels 56, 58, 60 therebetween. The bladder is preferably fabricated from a polymer material, and in particular an extrudable thermoplastic material such as PEEK, PPS, PES, or PEI. Though preferably fabricated from an expandable thermoplastic material, the bladder 70 may alternatively be fabricated from a thin metal sheet having a thickness of from about 0.001 to 0.003 inches. Prior to being extended through the first mold section 54 and fittings positioned therewithin, the bladder 70 is covered with a polymer impregnated fiber material, and in particular a sheet of interwoven carbon fiber material which is impregnated with a polymer composite. The polymer impregnated carbon fiber sheet includes a nylon wrap applied thereto which may be color dyed. The inclusion of the nylon wrap about the polymer impregnated carbon fiber sheet provides the resultant frame tube 12 with a glossy finish of any desired color.

Referring now to FIGS. 3–6, the extension of the bladder 70 into the first mold section 54 having the various fittings positioned therewithin is preferably accomplished through the utilization of a lower, first bladder fitting section 72 which defines a generally Y-shaped channel 74 therewithin. The channel 74 transitions into a lower, first bladder port 76 which is sized and configured identically to the first mold port 68 of the first mold section 54. The first bladder fitting section 72 is abutted against the sidewall portion of the first mold section 54 having the first mold port 68 formed therewithin such that the first mold port 68 and first bladder port 76 are aligned with each other.

Subsequent to the abutment of the first bladder fitting section 72 against the first mold section 54 in the aforementioned manner, one end of the bladder 70 is extended into one of the two arms of the channel 74 and through the aligned ports 76, 68. The bladder 70 is then extended through the bottom bracket fitting 22 via the bottom opening 42 and seat tube opening 38 thereof. After passing through the bottom bracket fitting 22, the bladder 70 is extended through the seat tube channel 60, and subsequently through the loop portions 28b, 28a, respectively, of the seat tube fitting 20. As will be recognized, when extended through the seat tube fitting 20, the bladder 70 is disposed within the void defined between the loop portions 28b, 28a, and hence the seat tube fitting recess 64 of the first mold section 54.

After passing through the seat tube fitting 20, the bladder 70 is extended through the cross bar channel 56, and subsequently through the loop portions 50a, 50b, respectively, of the head tube fitting 24. As in the seat tube fitting 20, when the bladder 70 is extended through the head tube fitting 24, the same is disposed within the void defined between the loop portions 50a, 50b, and hence the head tube fitting recess 62 of the first mold section 54.

After passing through the head tube fitting 24, the bladder 70 is extended through the down tube channel 58, and back into the bottom bracket fitting 22 via the down tube opening 40 thereof. The end of the bladder 70 is then extended back through the bottom opening 42, the aligned ports 68, 76, and the first bladder fitting section 72 via the remaining arm of the channel 74. Thus, when fully extended through the first mold section 54 and fittings disposed therewithin, the opposed ends of the bladder 70 protrude from respective arms of the channel 74 formed within the first bladder fitting section 72. It will be recognized that the bladder 70 may be extended through the first mold section 54 and fittings in the opposite direction, i.e., the bladder 70 may be extended through the head tube fitting 24 prior to being extended through the seat tube fitting 20.

After the bladder 70 (covered with the nylon wrapped, polymer impregnated carbon fiber sheet) has been extended through the first bladder fitting section 72 and first mold section 54 in the aforementioned manner, an upper, second mold section 78 is mated to the lower, first mold section 54, with an upper, second bladder fitting section 80 being mated to the lower, first bladder fitting section 72. The second mold section 78 and second bladder fitting section 80 are sized and configured to be mirror images of the first mold section 54 and first bladder fitting section 72, respectively.

When mated to each other, the first and second mold sections 54, 78 form a resultant mold 82 which includes a cavity 84 collectively defined by the cross bar, down tube and seat tube channels, and the head tube, seat tube and bottom bracket fitting recesses of the first and second mold sections 54, 78. As will be appreciated, the cavity 84 governs the shape of the frame tube 12. In addition to defining the cavity 84, the mating of the first and second mold sections 54, 78 to each other facilitates the formation of an opening within the sidewall of the mold 82 which is collectively defined by the lower, first mold port 68 formed in the first mold section 54, and an identically configured upper, second mold port formed in the second mold section 78. As previously indicated, due to the manner in which the fittings 20, 22, 24 are positioned within the first mold section 54, when the second mold section 78 is mated to the first mold section 54, portions of the fittings 20, 22, 24 protrude from the mold 82, i.e., are not captured within the cavity 84 thereof. The mold may also be configured so as to completely capture the fittings 20, 22, 24 within the cavity 84.

As seen in FIG. 6, the mating of the upper, second bladder fitting section 80 to the lower, first bladder fitting section 72 facilitates the formation of a bladder fitting 86 which is abutted against the sidewall of the mold 82. In this respect, the opening within the bladder fitting 86 collectively defined by the lower, first bladder port 76 and an identically configured upper, second bladder port formed within the second bladder fitting section 80 is aligned with the opening collectively defined by the first mold port 68 and second mold port within the second mold section 78. When the second bladder fitting section 80 is mated to the first bladder fitting section 72, the opposed ends of the bladder 70 protrude from respective ones of the arms of the Y-shaped passage collectively defined by the channel 74 and the Y-shaped channel formed in the second bladder fitting section 80.

The first and second mold sections 54, 78 are preferably maintained in engagement to each other via the extension of fasteners 88 such as screws through the coaxially aligned apertures 90 disposed within respective ones of corresponding pairs of lugs 92 formed on the sidewalls of the first and second mold sections 54, 78. The first and second bladder fitting sections 72, 80 are likewise maintained in engagement to each other via the extension of the fasteners 88 into pairs of coaxially aligned apertures 94 disposed therewithin.

Referring now to FIG. 6, subsequent to the mating of the second mold section 78 and second bladder fitting section 80 to the first mold section 54 and first bladder fitting section 72, respectively, one of the open ends of the bladder 70 is preferably closed through the attachment of a cap 96 thereto. The other open end of the bladder 70 is fluidly coupled to a pressurized air source 98. Thereafter, the mold 82, and hence the nylon wrapped, polymer impregnated carbon fiber sheet applied to the bladder 70 is heated. Concurrently with the heating of the mold 82, the bladder 70 is inflated via the air source 98 so as to cause the nylon wrapped, polymer impregnated carbon fiber sheet applied thereto to assume the shape of the cavity 84. Importantly, when the bladder 70 is inflated, the sheet expands into the void defined between the loop portions 28a, 28b of the seat tube fitting 20, the void defined between the loop portions 50a, 50b of the head tube fitting 24, and the side openings 44 of the bottom bracket fitting 22.

As will be recognized, the heating of the mold 82 and concurrent inflation of the bladder 70 in the aforementioned manner facilitates the formation of the frame tube 12 from the carbon fiber reinforced polymer composite. After being heated for a pre-determined amount of time, the mold 82 is subsequently cooled to harden the frame tube 12, with the second mold section 78 and second bladder fitting section 80 thereafter being detached from the first mold section 54 and first bladder fitting section 72. The resultant bicycle frame 10 is then removed from within the first mold section 54 and first bladder fitting section 72, with the excess portions of the bladder 70 and polymer composite protruding from the bottom opening 42 of the bottom bracket fitting 22 being cut-off. The bottom opening 42 of the bottom bracket fitting 22 may then be finished, i.e., filled, sanded and/or polished, to clean the appearance of the bicycle frame 10. Importantly, due to the manner in which the polymer impregnated carbon fiber sheet is expanded within the cavity 84 by the inflation of the bladder 70, the outer surface of the frame tube 12 is substantially continuous with the outer surfaces of the main body portions 25, 32, 46 of the fittings 20, 22, 24, as well as the loop portions 28a, 28b, 50a, 50b thereof.

Additional modifications and improvements of the present invention may also be apparent to those skilled in the art. For example, the bicycle frame 10 need not be provided with the head tube fitting 24. In this respect, after being extended through the bottom bracket and seat tube fittings 22, 20, the bladder 70 may be extended through the head tube fitting recess 62 (without the head tube fitting 24 being positioned therewithin). As will be recognized, the absence of the head tube fitting 24 would require that the section of the frame tube 12 formed by the expansion of the polymer impregnated carbon fiber sheet into the empty head tube fitting recess 62 be bored and sleeved to accommodate the steer tube. Additionally, the frame tube 12 may be formed so as not to include the seat tube portion 18 by extending the bladder 70 from the bottom bracket fitting 22, through the head tube fitting 24, and through the seat tube fitting 20. However, it will be recognized that if the frame tube 12 is configured in this manner, the mold 82 would need to be provided with a second opening adjacent the seat tube fitting 20 to facilitate the exit of one end of the bladder 70 therefrom.

In addition to the foregoing, the entry and exit point of the bladder 70 into and out of the mold 82 need not be disposed adjacent the bottom bracket fitting 22. In this respect, such entry/exit opening for the bladder 70 may be included in any portion of the sidewall of the mold 82, and may be adjacent either the seat tube or head tube fittings 20, 24 rather than adjacent the bottom bracket fitting 22. Additionally, separate entry and exit ports may be provided rather than being consolidated as a single opening within the sidewall of the mold 82. Moreover, as an alternative to the fittings 20, 22, 24, the frame tube 12 may be integrally connected to attachment fittings which are adapted to have fittings similar to the fittings 20, 22, 24 subsequently affixed thereto.

As such, the particular combination of parts and steps described and illustrated herein is intended to represent only one embodiment of the present invention, and is not intended to serve as limitations of alternative devices within the spirit and scope of the invention.

What is claimed is:

1. A method for forming a bicycle frame, comprising the steps of:
   (a) placing a seat tube fitting and a bottom bracket fitting within a first mold section;
   (b) extending an elongate bladder covered with a polymer impregnated fiber material and defining first and second ends through the seat tube fitting and the bottom bracket fitting within the first mold section;
   (c) mating a second mold section to the first mold section such that a cavity having a desired frame shape is defined therebetween;
   (d) heating the polymer impregnated fiber material; and
   (e) inflating the bladder so as to cause the polymer impregnated fiber material to substantially conform to the shape of the cavity.

2. The method of claim 1 wherein step (a) further comprises placing a head tube fitting within the first mold section and step (b) further comprises extending the bladder through the head tube fitting.

3. The method of claim 2 wherein step (c) comprises mating the first and second mold sections to each other such that the seat tube fitting, the bottom bracket fitting and the head tube fitting are only partially captured within the cavity.

4. The method of claim 2 wherein step (b) comprises extending a bladder covered with a polymer impregnated fiber material having a nylon wrap applied thereto through the seat tube fitting, the bottom bracket fitting, and the head tube fitting.

5. The method of claim 2 wherein step (b) comprises extending a bladder covered with a polymer impregnated fiber material having a color dyed nylon wrap applied thereto through the seat tube fitting, the bottom bracket fitting, and the head tube fitting.

6. The method of claim 2 wherein step (b) comprises extending the bladder through the seat tube fitting, the bottom bracket fitting and the head tube fitting such that the first and second ends thereof protrude from a first port disposed within the first mold section.

7. The method of claim 6 wherein step (c) comprises mating the second mold section to the first mold section such that the first and second ends of the bladder protrude from an opening collectively defined by the first port and a second port disposed within the second mold section.

8. The method of claim 2 wherein step (b) comprises extending the bladder through the seat tube fitting, the bottom bracket fitting, and the head tube fitting such that the first and second ends thereof protrude from a first port disposed within the first mold section adjacent the bottom bracket fitting.

9. The method of claim 8 wherein step (c) comprises mating the second mold section to the first mold section such that the first and second ends of the bladder protrude from an opening collectively defined by the first port and a second port disposed within the second mold section adjacent the bottom bracket fitting.

10. The method of claim 2 further comprising the step of:
    (f) cooling the first and second mold sections subsequent to inflating the bladder to form a continuous bicycle frame tube having the seat tube fitting, the bottom bracket fitting, and the head tube fitting integrally connected thereto.

11. The method of claim 2 wherein step (b) comprises extending a thermoplastic bladder through the seat tube fitting, the bottom bracket fitting, and the head tube fitting.

12. The method of claim 1 wherein step (d) comprises heating the first and second mold sections.

13. The method of claim 1 wherein steps (d) and (e) are simultaneously conducted.

14. The method of claim 2 wherein step (c) comprises mating the first and second mold sections to each other such that the seat tube fitting, the bottom bracket fitting and the head tube fitting are completely captured within the cavity.

15. A bicycle frame comprising:
    a frame tube defining a cross-bar portion and a down tube portion, said frame tube being formed entirely from a single continuous section of a fiber reinforced polymer composite;
    a seat tube fitting attached to said frame tube; and
    a bottom bracket fitting attached to said frame tube.

16. The bicycle frame of claim 15 further comprising a head tube fitting attached to the frame tube, the cross-bar portion extending between the seat tube fitting and the head tube fitting and the down tube portion extending between the bottom bracket fitting and the head tube fitting.

17. The bicycle frame of claim 16 wherein the frame tube further defines a seat tube portion extending between the seat tube fitting and the bottom bracket fitting.

18. The bicycle frame of claim 15 wherein the frame tube comprises an outer layer of nylon.

19. The bicycle frame of claim 18 wherein the outer layer of nylon is color dyed.

20. The bicycle frame of claim 15 wherein the frame tube is at least partially formed from a continuous section of a carbon fiber reinforced polymer composite.

21. The bicycle frame of claim 20 wherein the carbon fiber reinforced polymer composite comprises a sheet of interwoven carbon fiber material.

22. The bicycle frame of claim 16 wherein the seat tube fitting, the bottom bracket fitting, and the head tube fitting are each integrally connected to the frame tube.

23. A method of forming a bicycle frame, comprising the steps of:
    (a) at least partially forming a frame tube from a continuous section of a fiber reinforced polymer composite such that at least a cross-bar portion and a down tube portion are defined thereby; and
    (b) attaching at least a seat tube fitting and a bottom bracket fitting to the frame tube.

24. The method of claim 23 wherein:
    step (a) comprises forming the frame tube to further define a seat tube portion; and
    step (b) comprises further attaching a head tube fitting to the frame tube.

25. A method of forming a bicycle frame, comprising the steps of:
    (a) placing at least a seat tube fitting and a bottom bracket fitting into a mold; and
    (b) at least partially forming a frame tube within the mold from a continuous section of a fiber reinforced polymer composite such that at least a cross-bar portion and a down tube portion are defined thereby and at least the seat tube fitting and the bottom bracket fitting are integrally connected thereto.

26. The method of claim 25 wherein:
    step (a) comprises further placing a head tube fitting into the mold; and
    step (b) comprises forming the frame tube such that a seat tube portion is further defined thereby and the head tube fitting is integrally connected thereto.

* * * * *